United States Patent [19]

Matsui et al.

[11] Patent Number: 4,578,164
[45] Date of Patent: Mar. 25, 1986

[54] METHOD OF ELECTROLYTICALLY FINISHING SPRAY-HOLE OF FUEL INJECTION NOZZLE

[75] Inventors: Yukio Matsui, Yokosuka; Mitsuo Uchiyama, Yokohama, both of Japan

[73] Assignee: Nissan Motor Co., Ltd., Japan

[21] Appl. No.: 637,728

[22] Filed: Aug. 6, 1984

[30] Foreign Application Priority Data

Aug. 24, 1983 [JP] Japan ............................ 58-154719
Sep. 14, 1983 [JP] Japan ......................... 58-141539[U]

[51] Int. Cl.$^4$ ............................................ B23H 9/02
[52] U.S. Cl. ............................ 204/129.55; 204/129.6; 204/129.65; 204/129.7
[58] Field of Search ............ 204/129.55, 129.6, 129.65, 204/129.7

[56] References Cited

U.S. PATENT DOCUMENTS

| 2,848,401 | 8/1958 | Hartley | 204/143 |
| 3,384,563 | 5/1968 | Taylor | 204/129.6 |
| 3,409,524 | 11/1968 | Olson | 204/129.7 |
| 3,449,226 | 6/1969 | Williams | 204/129.7 |
| 3,705,843 | 12/1972 | Sickels | 204/129.7 |
| 4,174,268 | 11/1979 | Andrews | 204/129.55 |

FOREIGN PATENT DOCUMENTS

| 0024816 | 2/1980 | Japan | 204/129.55 |
| 1164536 | 9/1969 | United Kingdom | 204/129.6 |

Primary Examiner—John F. Niebling
Assistant Examiner—Terryence Chapman
Attorney, Agent, or Firm—Lane and Aitken

[57] ABSTRACT

A method of finishing spray-holes bored by machining in the body of a fuel injection nozzle for an IC engine by removing burrs that remain after machining around the inside mouth of each spray-hole. Employed is electrolytic polishing process wherein the nozzle body is made the anode. A tubular electrode having an insulator cover is inserted into the nozzle body, and electrolyte liquid is supplied through the tubular electrode to flow out through the spray-holes. An end portion of the insulator cover completely covers the tip portion of the electrode and comes into close contact with the inner surface of the nozzle body over an area in which the spray-holes are open. In the insulator cover, liquid passages are formed so as to inject the electrolyte liquid only at the location of the mouth of each spray-hole to thereby prevent dissolution of the nozzle body inner surface in unwanted areas. Accordingly the removal of the burrs is achieved without increasing the volume of dead space in the nozzle body.

4 Claims, 8 Drawing Figures

METHOD OF ELECTROLYTICALLY FINISHING SPRAY-HOLE OF FUEL INJECTION NOZZLE

BACKGROUND OF THE INVENTION

This invention relates to a method of finishing a spray-hole or spray-holes bored in the body of a fuel injection nozzle for an internal combustion engine, particularly for a diesel engine, by electrolytic polishing mainly for the purpose of removing burrs existing around the periphery of the inner mouth of each spray-hole.

In a diesel engine, pressurized fuel supplied from a fuel injection pump is ultimately atomized and injected into the combustion chamber by means of a fuel injection nozzle. Naturally the functional characteristics of the injection nozzle greatly influence the engine performance.

In a popular fuel injection nozzle of the type formed with a so-called sac hole in its tip portion, a plurality of spray-holes are bored in the nozzle body wall defining the sac hole each at a predetermined angle with the center axis of the injection nozzle. Usually the spray-holes are bored from the outside by machining such as drilling, and it is inevitable that burrs remain on the inner surface of the nozzle body around the mouth of each spray-hole. Such burrs must be removed because, if left unremoved, the burrs offer increased resistance to the flow of fuel to result in deterioration of the fuel atomizing efficiency and the combustion efficiency. However, it is very difficult to remove the burrs by machining since the burrs exist in the deep of the nozzle body and can hardly be observed by the eye. Usually the burrs are removed by an electrolytic polishing process.

Electrolytic polishing is a process reverse of plating. In an electrolyte liquid such as an aqueous solution of sodium chloride, the metal work to be polished is made the anode in an electric circuit and a separate conductor the cathode. While an electric current is applied through the electrolyte liquid, electrochemical dissolution of the work surfaces proceeds continuously. To prevent accumulation of the dissolved metal ions on the cathode, a relatively high pressure is applied to the electrolyte liquid so that the liquid makes a high velocity flow through the gap between the work and the cathode.

In the conventional electrolytic polishing process for removing the burrs in the fuel injection nozzle body, a tubular electrode (cathode) covered with an insulator is inserted into the nozzle body which is secured to the electropolishing apparatus and made the anode. In an end portion the insulator covering the tubular cathode has a conical outer surface which comes into close contact with the valve seat surface in the nozzle body, and the open end portion of the tubular cathode protrudes from the insulator so as to open into the sac hole at short distances from the spray-holes. In this state electrolytic polishing is performed by injecting the electrolyte liquid into the sac hole through the interior of the tubular cathode. The liquid flows out of the sac hole through the spray-holes, carrying away the metal ions formed by dissolution of the projecting burrs.

In removing the burrs by this method it is inevitable that the metal surface defining the sac hole dissolves to some extent, particularly in a region opposite to the open end of the tubular cathode, with a resultant increase in the volume of the sac hole. Consequently, in a fuel injection nozzle using the nozzle body finished by the electrolytic polishing process an increased dead space exists between the tip of the needle valve in the closing position and the inner surface of the nozzle body. After closing of the needle valve to terminate fuel injection, fuel remaining in the increased dead space dribbles through the spray-holes and undergoes incomplete combustion. For this reason, the conventional electrolytic polishing process for the removal of the burrs becomes a cause of increased emission of unburned hydrocarbons.

This problem is encountered also in the case of a fuel injection nozzle of the so-called sac-less type in which the inside mouth of each spray-hole is contained in the conical valve seat surface in the nozzle body. In this case the electrolytic polishing process for removing the burrs around the inside mouth of each spray-hole employs a tubular electrode covered with an insulator having a conical end portion which comes into close contact with a major area of the valve seat surface in the nozzle body. However, the valve seat surface is left exposed in a small area where the spray-holes are formed, and an end portion of the tubular electrode protrudes into a space defined by the exposed portion of the valve seat surface and is formed with radial holes to inject the electrolyte liquid toward the respective spray-holes. During the electrolytic polishing process, local dissolution of the valve seat surface occurs in the area exposed to the electrolyte liquid. Therefore, when the needle valve in the completed fuel injection nozzle is in the closing position unintended dead spaces exist between the needle valve and the inner surface of the nozzle body with an adverse effect on the exhaust emission.

SUMMARY OF THE INVENTION

It is an object of the present invention to provide an improved method of finishing the spray-holes bored in the body of a fuel injection nozzle, the improved method using an electrolytic polishing technique to remove the aforementioned burrs and enabling to completely remove the burrs without accompanied by dissolution of the inner surface of the nozzle body in unwanted areas.

The present invention provides a method of finishing at least one spray-hole bored by machining in the body of a fuel injection nozzle for an internal combustion engine by removing burrs that remain after the machining around the inside mouth of each spray-hole. In this method, the inner surface of the nozzle body in an area containing the inside mouth of each spray-hole is subjected to an electrolytic polishing treatment, wherein the nozzle body is made the anode, by inserting a tubular electrode having an insulator cover into the nozzle body such that an end portion of the electrode comes close to each spray-hole and supplying a pressurized electrolyte liquid into the interior of the nozzle body through the tubular electrode to flow out through each spray-hole. This method is characterized in that an end portion of the insulator cover is so formed as to completely cover the end portion of the electrode and to have an outer surface which makes close contact with the aforementioned area of the inner surface of the nozzle body, that for each spray-hole the insulator cover is formed with a liquid passage which communicates with the interior of the tubular electrode and has an outlet port in the aforementioned outer surface such that the outlet port faces the mouth of the spray-hole and is only slightly larger in diameter than the mouth of the spray-hole, and that during the electrolytic polishing treatment the electrolyte liquid supplied through the tubular electrode flows out of the insulator cover only through the passage formed for each spray-hole.

In the method according to the invention, the suitably shaped end portion of the insulator cover surely prevents the inner surface of the nozzle body from undergoing electrolytic polishing except in very small areas around the respective spray-holes. Therefore, the burrs are efficiently and completely be removed without producing an increased dead space in the nozzle body. In other words, the removal of the burrs by electrolytic polishing is achieved with no adverse effects on the performance of the fuel injection nozzle using the finished nozzle body. As an additional advantage of this method, the electrolytic polishing treatment can be accomplished with reduced consumption of electric power and in a shortened operation time since only a truly required and very small volume of metal is anodically dissolved in this method.

In a nozzle body finished by this method, each spray-hole will be enlarged slightly and diametrically only in a short section contiguous to the inside mouth thereof, because the edge initially defining the inside mouth of the spray-hole undergoes anodic dissolution as well as the burrs. This offers practically no problem to the performance of the fuel injection nozzle. Moreover, we have confirmed that in the case of a sac-less nozzle the enlargement of the mouth section of each spray-hole has the effect of increasing the flow coefficient in the injection nozzle and produces very favorable effects on the performance of the sac-less fuel injection nozzle without the need of increasing the diameter of the spray-holes, as will be explained hereinafter.

DESCRIPTION OF THE PREFERRED EMBODIMENTS

The following is a detailed description of the invention with respect to its application to a known fuel injection nozzle of the sac-less type for use in a direct injection diesel engine.

Figure 1:
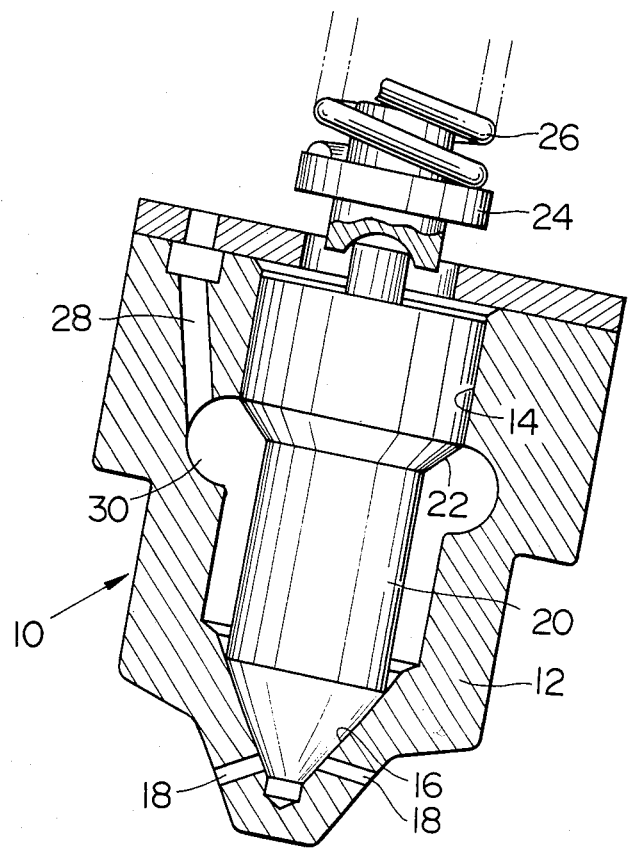
FIG. 1 is a longitudinal sectional view of a fuel injection nozzle of the sac-less type to which the present invention is applicable.

FIG. 1 shows a sac-less injection nozzle 10 having a nozzle body 12 and a needle valve 20 received in the hollow body 12. The nozzle body 12 is formed with a generally cylindrical needle chamber 14 in the rear end portion and a conical valve seat 16 in the forward end portion, and a plurality of spray-holes 18 are bored in the conical wall which provides the valve seat 16. In a middle section of the valve body 12 there is formed an oil chamber 30 to which fuel is supplied from a fuel injection pump (not shown) through oil passage 28, so that a hydraulic pressure is applied to a frustum surface 22 of the needle valve 20. Via a push rod 24, a coil spring 26 biases the needle valve 20 to its closed position as illustrated. When the hydraulic pressure acting on the frustum surface 22 is intensified the needle valve 20 moves against the force of the spring 26 to lift from the valve seat 16. Then the pressurized fuel intrudes into the gap between the needle valve 20 and the valve seat 16, and is injected into the combustion chamber (not shown) through the spray-holes 18. When the fuel injection pump stops pumping the pressure acting on the frustum surface 22 so lowers as to allow seating of the needle valve 20 on the valve seat 16, and therefore the injection of fuel terminates.

The spray-holes 18 are bored by machining such as drilling from the outside of the nozzle body 12. Therefore, it is inevitable that some burrs (as indicated at 15 in FIG. 3) remain on the conical inner surface 16 of the nozzle body 12 around the inside mouth of each spray-hole 18. To remove such burrs 15, the present invention employs an electrolytic polishing method in which an electrode of a novel construction is used.

Figure 2A:
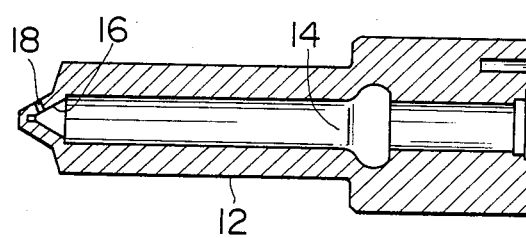
FIG. 2(A) is a longitudinal sectional view of a fuel injection nozzle subjected to finish processing according to the invention.
Figure 2B:
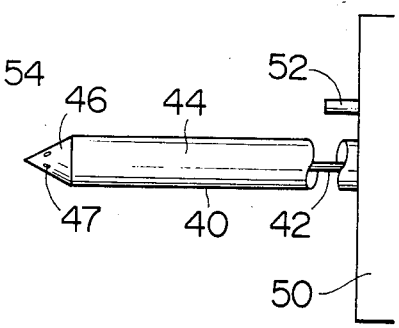
FIG. 2(B) is a side elevational view of an electrode part of an electropolishing apparatus used in the present invention to finish the injection nozzle of FIG. 2(A)
Figure 3:
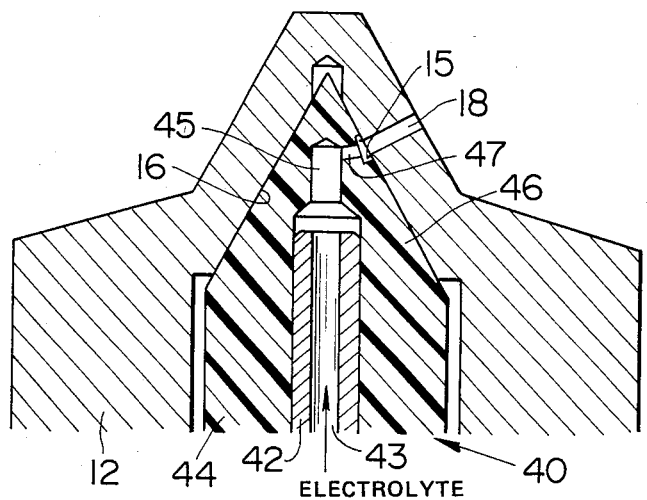
FIG. 3 shows the electrode of FIG. 2(B) inserted in the injection nozzle of FIG. 2(A) in an enlarged and partial sectional view.

FIG. 2(A) shows a nearly finished sac-less injection nozzle body 12 which should be taken as analogous to the one shown in FIG. 1, and FIG. 2(B) shows an electrode 40 according to the invention used for removing the burrs existing around the inside mouth of each spray-hole 18 of the nearly finished nozzle body 12 by an electrolytic polishing process. The electrode 40 has a generally cylindrical shape and is made up of a tubular conductor 42 and a generally cylindrical insulator 44 concentrically covering the entire length of the conductor 42. A forward end portion 46 of the insulator 44 is shaped conically in conformance with the tapered annular shape of the valve seat 16 in the nozzle body 12. As shown in FIG. 3, when the electrode 40 is inserted into the nozzle body 12 the conical end portion 46 of the insulator 44 comes into close contact with the valve seat 16. The central hole 43 of the tubular conductor 42 is used as an electrolyte liquid passage. The conductor 42 does not extend to the tip of the conical end portion 46 of the insulator 44, but a small chamber 45 is formed in the conical end portion 46 of the insulator 44 so as to serve as an extension of the liquid passage 43. For each spray-hole 18 of the nozzle body 12, a passage 47 of a small diameter extends from the chamber 45 generally radially so as to open in the conical outer surface of the insulator 44 in an area opposite the spray-hole 18. The diameter of this passage 47 is somewhat enlarged in its outer port portion so as to become slightly larger than the diameter of the inner mouth of the spray-hole 18. Therefore, the aforementioned burrs 15 do not offer obstruction to close contact of the conical end portion 46 of the insulator 44 with the valve seat 16.

The material of the insulator 44 can be selected from a wide variety of organic and inorganic insulating materials. For example, it is generally suitable to use a synthetic resin such as an acrylic resin or a polyflurohydrocarbon resin. Where importance is attached to the resistance to corrosion by the action of the electrolyte liquid, use may be made of a ceramic material. It is rather favorable to use an elastomeric insulating material such as a synthetic rubber because very close contact of the insulator 44 with the valve seat 16 is realized by elastic deformation of the end portion 46 of the insulator 44 in conformity with the actual shape of the valve seat 16.

To ensure that each of the radial passages 47 in the electrode 40 comes into alignment with the intended one of the spray-holes 18 of the nozzle body 12, an electrode supporting part 50 of the electropolishing apparatus shown in FIG. 2(B) has a positioning pin 52 and the nozzle body 12 in FIG. 2(A) is formed with a positioning hole 54. When inserting the electrode 40 into the nozzle body 12, the nozzle body 12 is secured to the electropolishing apparatus in such an orientation that the pin 52 fits into the hole 54 to thereby establish a proper angular relation between the nozzle body 12 and the electrode 40.

To perform electrolytic polishing, a pressurized electrolyte liquid such as an aqueous solution of sodium chloride is injected into the chamber 45 in the electrode 40 held in the position shown in FIG. 3 through the passage 43 in the conductor 42 to flow out through the radial passages 47 and the respective spray-holes 18. The nozzle body 12, which is made the anode, is connected to the positive terminal of a direct-current power source (not shown) and the conductor 42 of the electrode 40 to the negative terminal in order to apply an electric current through the electrolyte liquid flowing in the aforementioned way. Then there occurs electrochemical or anodic dissolution of the protuberant burrs 15 on the circumference of the inside mouth of each spray-hole 18 and the circumferential edge defining the same mouth. The dissolved metal ions are carried away by the flowing electrolyte liquid and blown off through each spray-hole 18.

Figure 4:
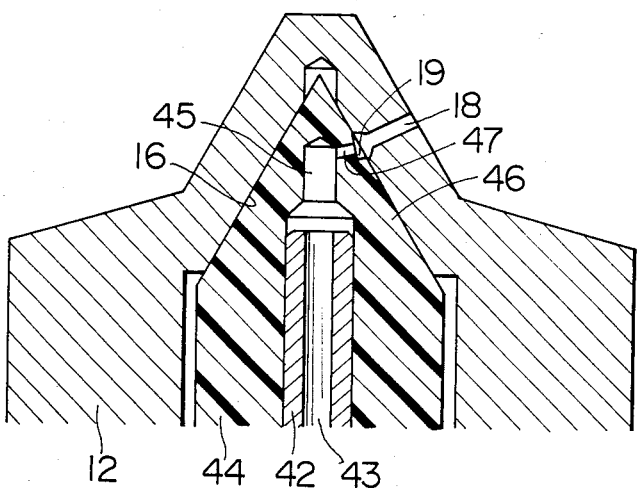
FIG. 4 shows the same parts as in FIG. 3 in a similar view but in a state after finish processing according to the invention.

Complete removal of the burrs 15 is achieved by the above described electrolytic polishing operation. Referring to FIG. 4, the dissolution of the circumferential edge defining the inside mouth of each spray-hole 18 during the electrolytic polishing process results in a slight enlargement of the spray-hole diameter in the mouth region indicated at 19. However, in the remaining (substantially the entire) areas of the valve seat surface 16 the nozzle body material is not the least dissolved because that surface 16 is closely covered with the conical portion 46 of the insulator 44. Thus, the removal of the burrs 15 by the method according to the invention is not accompanied by an increase in the volume of the space in the tip portion of the nozzle body 12.

Figure 5:
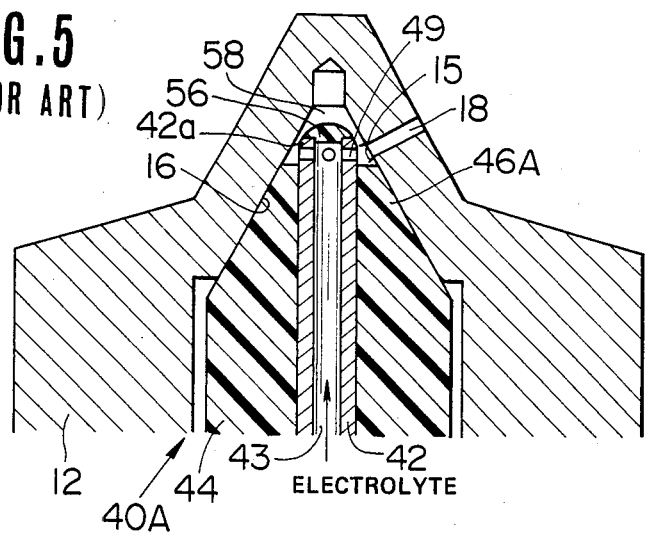
FIG. 5 shows, in a view similar to FIG. 3, an electrode used in a conventional electrolytic polishing method for finishing the injection nozzle of FIGS. 2(A) and 3.

For comparison, FIG. 5 shows a conventional electrode 40A used for removing the burrs 15 in the above described sac-less nozzle body 12. This electrode 40A is also made up of a tubular conductor 42 and a generally cylindrical insulator 44 concentrically covering the conductor 42, and a forward end portion 46A of the insulator 44 has a generally conical shape. However, the conical end portion 46A is made short so as not to block the spray-holes 18 when the electrode 40A is inserted into the nozzle body 12. A tip end portion 42a of the tubular conductor 42 protrudes from the end face of the insulator 44, and a radial through-hole 49 is bored in this portion 42a of the conductor 42 at the location of each spray-hole 18. The open end of the tubular conductor 42 is closed by an insulator 56. As illustrated, a space 58 is left around the protruding end portion 42a of the conductor 42.

During the electrolytic polishing operation the electrolyte liquid is injected through each radial hole 49 directed to the burrs 15, so that the burrs 15 can completely be dissolved. However, the electrolyte liquid is injected also in the opposite direction to collide against the valve seat surface 16 in an area 180 degrees distant from each spray-hole 18 and then swirls in the space 58 before flowing out of the nozzle body 12 through the spray-holes 18. Therefore, there occurs considerable dissolution of the nozzle body material in areas around the respective spray-holes 18 and also in areas opposite to the respectively spray-holes 18. Consequently, the volume of a dead space in the tip portion of the nozzle body 12 increases and, in the completed fuel injection nozzle, unwanted spaces are produced between the needle valve and the valve seat surface 16.

Figure 6:
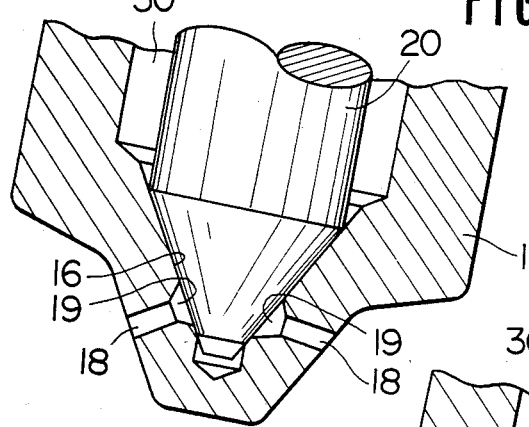
FIG. 6 is an enlarged and partial sectional view of a fuel injection nozzle of the sac-less type, showing a result of finish processing according to the invention.

When the method according to the invention is applied to a sac-less fuel injection nozzle, the aforementioned enlargement of the mouth section 19 of each spray-hole 18 has favorable effects on the performance of the fuel injection nozzle. Referring to FIG. 6, the enlarged mouth section 19 of each spray-hole 18 is defined by a tapered annular wall face and may be regarded as a result of chamfering of the circumferential edge defining the inner mouth of the spray-hole 18.

In general, a problem inherent to a sac-less fuel injection nozzle is that the flow coefficient becomes relatively small compared with a popular sac nozzle because in the case of the sac-less nozzle the fuel stream lines in the narrow gap between the needle valve and the valve seat make a large bend in the vicinity of the inner mouth of each spray-hole. Therefore, if the two types of the injection nozzles are formed with spray-holes of the same diameter the sac-less nozzle requires extension of the injection duration, which is unfavorable for the engine output performance, and tends to cause emission of smoke and increased consumption of fuel. Besides, due to the fact that the flow coefficient in a sac-less nozzle is considerably influenced by the bend of the fuel stream lines there arises a possibility of injection of nonuniform amounts of fuel from the respective spray-holes of a multi-hole nozzle of the sac-less type when the nozzle is attached to the engine at a large angle of inclination. This becomes a cause of small freedom of desine in respect of the arrangement of fuel injection valves in the engine.

It is undesirable to enlarge the diameter of the spray-holes to solve the above problems because of lowering of the sprayed fuel atomization efficiency and increase of the emission of smoke and unburned hydrocarbons. It is conceivable to solve the problems by increasing the maximum lift of the needle valve, but this is not practical because of an increase in relatively large droplets of fuel which is attributed to after-dribbling and results in emission of smoke and unburned hydrocarbons besides lowering of the durability of the injection nozzle due to an increased pressure on the valve seat surface at seating of the needle valve.

Turning again to FIG. 6, the enlargement or chamfering of the inside mouth section 19 of each spray-hole 18 made by the electrolytic polishing method according to the invention has the effect of reducing the degree of the bend of the fuel stream lines in the vicinity of each spray-hole 18 and, consequently, improving the flow coefficient in the spray-holes 18 to nearly the same level as in the spray-holes of a sac nozzle. Therefore, the above described problems in the conventional sac-less nozzles attributed to the smallness of the flow coefficient are solved without increasing the diameter of the spray-holes 18. It has been confirmed by experiments that the enlargement of the mouth section 19 of each spray-hole 18 in the sac-less nozzle enables to shorten the injection duration for injection of a given quantity of fuel over a wide range of engine speed represented by the rpm of the fuel injection pump. Shortening of the injection duration in high-speed ranges of the engine leads to success in maintaining the required output performance and also in improving the fuel economy. Together with such improvements, the atomization of the sprayed fuel in low-speed ranges of the engine is also improved.

Figure 7:
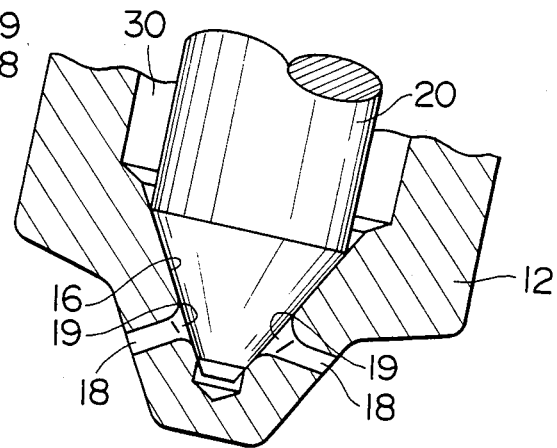
FIG. 7 is generally similar to FIG. 6 but shows a minutely different result of the finish processing.

Referring to FIG. 7, in practice the tapered annular surface defining the enlarged section 19 of each spray-hole 18 will become a gently curved surface. That is, the original circumferential edge defining the spray-hole mouth will be rounded off rather than being sharply chamfered. Such rounding of the annular surface defining the enlarged section 19 is rather favorable for improving the flow coefficient by reducing the bend of the fuel stream lines. Considering more minutely, it is desirable that the annular surface defining the enlarged section 19 is relatively largely rounded off with a relatively large radius of curvature in its half area on the upstream side (with respect to the direction of the flow of fuel in the nozzle body 12) than in the other half area on the downstream side. By doing so, the effects of the enlargement of the mouth section 19 can be obtained even when the degree of enlargement is relatively small. Such a manner of selectively nonuniform curving of the annular surface is particularly desirable in spray-holes 18 bored at a relatively large angle with the center axis of the nozzle body 12, because this is effective for reduction of the nonuniformity in the quantity of fuel injected from the respective spray-holes 18 even when the injection nozzle is attached to the engine at a relatively large angle of inclination. Such a selectively nonuniform enlargement of the mouth section 19 of each spray-hole 18 is possible by suitably designing the shape of the outlet port portion of the radial passage 47 in the insulator 44 of the electrode 40.

The method of the invention is applicable also to a fuel injection nozzle formed with a sac hole, and complete removal of the burrs existing along the circumference of the mouth of each spray-hole can easily be achieved without increasing the volume of the sac hole. In that case, use is made of an electrode entirely covered with an insulator of which the tip portion is so shaped as to closely fit into the sac hole, usually of a generally semi-spherical shape, and formed with small-diameter passages that come into alignment with the respective spray-holes bored in the wall defining the sac hole.

What is claimed is:

1. A method of finishing at least one spray-hole bored by machining in a body of a fuel injection nozzle for an internal combustion engine by removing burrs that remain after the machining around an inside mouth of each spray-hole, the method having the step of subjecting an inner surface of the nozzle body in an area containing the inside mouth of each spray-hole to an electrolytic polishing treatment, wherein the nozzle body is made the anode, by inserting a tubular electrode having an insulator cover into the nozzle body such that an end portion of the electrode comes close to each spray-hole and supplying a pressurized electrolyte liquid into the interior of the nozzle body through the tubular electrode to flow out through each spray-hole, characterized in that an portion of said insulator cover is so formed as to completely cover said end portion of said electrode and to have an outer surface which makes close contact with said area of the inner surface of the nozzlbe body, that for each spray-hole said insulator cover is formed with a liquid passage which communicates with the interior of said tubular electrode and has an outlet port in said outer spray-hole and is only slightly larger in diameter than the mouth of the spray-hole, and that during the electrolytic polishing treatment the electrolyte liquid supplied through said tubular electrode flows out of said insulator cover only through said passage formed for each spray-hole.

2. A method according to claim 1, wherein said insulator cover is formed of an elastomeric insulator at least in said end portion thereof.

3. A method according to claim 1, wherein the electrolytic polishing treatment is carried out such that the edge defining the inside mouth of each spray-hole dissolves to such an extent that each spray-hole is diametrically enlarged only in a short section contiguous to the inside mouth thereof.

4. A method according to claim 3, wherein the inside mouth of each spray-hole is contained in a valve seat surface in the nozzle body.

* * * * *